United States Patent [19]

Akutagawa et al.

[11] Patent Number: 4,954,602
[45] Date of Patent: Sep. 4, 1990

[54] LIQUID, EPOXY RESIN COMPOSITION

[75] Inventors: Ichiro Akutagawa, Nagareyama; Tsutomu Yamaguchi; Toshihiro Hanamori, both of Saitama; Kunimitsu Matsuzaki, Yono; Shinobu Okamura, Shimada, all of Japan

[73] Assignee: Somar Corporation, Japan

[21] Appl. No.: 369,998

[22] Filed: Jun. 23, 1989

[30] Foreign Application Priority Data

Jun. 24, 1988 [JP] Japan ................. 63-154889

[51] Int. Cl.$^5$ ................. C08G 59/24; C08G 59/68
[52] U.S. Cl. ........................ 528/93; 528/103
[58] Field of Search ................ 528/93, 103, 99

[56] References Cited

U.S. PATENT DOCUMENTS

| | | | |
|---|---|---|---|
| 4,026,862 | 3/1977 | Smith et al. | 528/93 X |
| 4,069,202 | 1/1978 | Carey | 528/93 |
| 4,271,079 | 6/1981 | Maeda et al. | 528/93 X |
| 4,420,604 | 12/1983 | Wallace | 528/93 |
| 4,617,330 | 10/1986 | Thai et al. | 523/444 X |

Primary Examiner—Earl Nielsen
Attorney, Agent, or Firm—Lorusso & Loud

[57] ABSTRACT

A liquid, epoxy resin composition suitable for use in fixation of a stator coil or a rotor coil is disclosed, which comprises (A) a mixture containing ($a_1$) a Bisphenol A epoxy resin and ($a_2$) an alicyclic epoxy resin; and (B) a curing agent including ($b_1$) an acid anhydride, and ($b_2$) a phenol compound of the general formula:

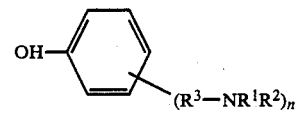

wherein $R^1$ and $R^2$ represent independently from each other a lower alkyl, $R^3$ represents a lower alkylene and n is an integer of 1-5, the amount of the phenol compound ($b_2$) being in the range of 2-8% based on the weight of the mixture (A).

14 Claims, No Drawings

LIQUID, EPOXY RESIN COMPOSITION

BACKGROUND OF THE INVENTION

This invention relates generally to an epoxy resin composition and, more particularly, to a liquid, epoxy resin composition having a good penetrability and suitable for fixing stator or rotor coils.

In fabrication of motors and generators to be used in automobiles, epoxy resin compositions have been hitherto used for fixing stator coils or armature coils. One known epoxy resin composition of this type is composed of 3,4-epoxycyclohexyl-methyl-(3,4-epoxy)cycloheanecarboxylate, methylnadic anhydride and resorcinol (Japanese Unexamined Patent Application No. 57-174314). In use, this composition is mixed with a small amount of triethanolamine and the mixture is applied to a coil to be fixed. The curing is performed at 120° C. for 16 hours and then at 180° C. for 16 hours. Thus, this epoxy composition has a drawback because it requires a long curing time. Another problem of the known epoxy resin composition is related to the coloring of the composition when it is heated for curing.

SUMMARY OF THE INVENTION

It is, therefore, an object of the present invention to provide a novel epoxy resin composition which is devoid of the drawbacks of the conventional epoxy resin composition.

It is a special object of the present invention to provide an epoxy resin composition which has good penetrability into interstices of coil windings, which can fix the coil tightly and which can give a cured body excellent in both heat-resistance and mechanical strength.

It is a further object of the present invention to provide an epoxy resin composition of the above-mentioned type which can be cured with a relatively short period of time and which does not color when heated to a curing temperature.

It is yet a further object of the present invention to provide an epoxy resin composition which has a long pot life or shelf life.

In accomplishing the foregoing objects, the present invention provides a liquid, epoxy resin composition comprising:
(A) a mixture containing
 (a$_1$) a Bisphenol A epoxy resin, and
 (a$_2$) an alicyclic epoxy resin; and
(B) a curing agent including
 (b$_1$) an acid anhydride, and
 (b$_2$) a phenol compound of the general formula:

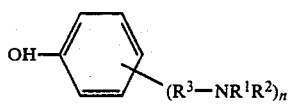

(I)

wherein R$^1$ and R$^2$ represent independently from each other a lower alkyl, R$^3$ represents a lower alkylene and n is an integer of 1-5, the amount of the phenol compound being 2-8% based on the weight of the mixture (A).

Other objects, features and advantages of the present invention will become apparent from the detailed description of the invention to follow.

DETAILED DESCRIPTION OF THE INVENTION

The Bisphenol A epoxy resin to be used in the present invention is a product obtained by reaction of Bisphenol A with epichlorohydrin and preferably has an epoxy equivalent of 170-270. The term "epoxy equivalent" used in the present specification is intended to refer to so-called "weight per epoxy equivalent" which is a weight (g) of the epoxy resin providing 1 g equivalent of the epoxy group. Epikote #828 and #834 (manufactured by Yuka Shell Epoxy Inc.) and Adeca 4100 and 4300 (manufactured by Asahi Denka Inc.) are illustrative of suitable Bisphenol A epoxy resins.

The alicyclic epoxy resin (or cycloaliphatic epoxy resin) to be used in conjunction with the Bisphenol A epoxy resin may be, for example, 3,4-epoxycyclohexylmethyl 3,4-epoxycyclohexanecarboxylate of the formula:

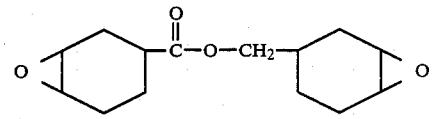

vinylcyclohexylene dioxide of the formula:

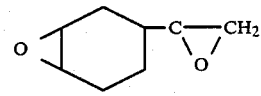

bis(3,4-epoxycyclohexylmethyl) adipate of the formula:

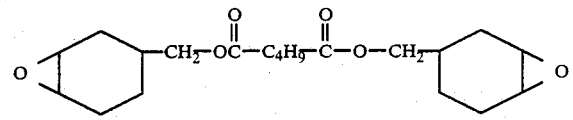

or 6-(3,4-epoxycyclohexyl)-1,5-meta-dioxane-3-spiro-3',4'-epoxycylohexane of the formula:

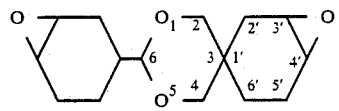

The weight ratio of the Bisphenol A epoxy resin to the alicyclic epoxy resin is generally 3:7 to 9:1. A proportion of the Bisphenol A epoxy resin below the above specified range tends to cause reduction of mechanical strength, such as resistance to cracking, of the cured body obtained from the epoxy resin composition. On the other hand, when the proportion of the Bisphenol A epoxy resin exceeds the above upper limit, the penetrability of the resulting composition becomes poor and the heat resistance of the cured body thereof becomes also poor. The weight ratio of the Bisphenol A epoxy resin to the alicyclic epoxy resin is preferably 70:30 to 85:15.

A diluent having a low molecular weight and a low viscosity and containing one or more epoxy groups may be incorporated into the epoxy resin composition as a reactive diluent, if desired. Examples of such diluents include 1,6-hexanediol diglycidyl ether, polyalkyleneglycol diglycidyl ether, trimethylolpropane triglycidyl ether, butyl glycidyl ether and phenyl glycidyl ether. The amount of the diluent is generally 20% or less based on the total weight of the Bisphenol A epoxy resin and the alicyclic epoxy resin. The addition of the diluent is effective in lowering the viscosity of the epoxy resin composition.

As a curing agent for the above mixed epoxy resins, the present invention employs a combination of an acid anhydride and a specific phenol compound expressed by the above general formula (I). The acid anhydride may be, for example, methyltetrahydrophthalic anhydride, methylhexahydrophthalic anhydride, methylnadic anhydride and methylbutenyltetrahydrophthalic anhydride.

As the phenol compound, there may be preferably used a compound of the formula (I) in which $R^1$ and $R^2$ stand independently from each other methyl, ethyl or propyl, $R^3$ stands for methylene or ethylene and n is an integer of 2-4. Especially suitably used are 2,4,6-tri(N,N-dimethylaminomethyl)-phenol and 2-(N,N-dimethyl)aminomethylphenol. The phenol compound serves to act not only as a curing accelerator but also as a coloring-preventing agent. When an imidazole compound is used as a curing accelerator, the cured resin becomes black in color. In contrast, the phenol compound does not cause such a coloring of the cured resin.

The acid anhydride is generally used in an amount of 0.5-1.5 mole, preferably 0.8-1.2 mole per one equivalent of the epoxy group of the Bisphenol A and alicyclic epoxy resins (the mixture (A)). It is important that the phenol compound be used in an amount of 2-8% based on the weight of the mixture (A). An amount of the phenol compound below 2.0% by weight is undesirable because a relatively long time is required for causing the composition to gel and to lose fluidity during the initial stage of the curing (gellation time). Too high an amount of the phenol compound, on the other hand, tends to result in the coloring of the cured resin. Very good results (gellation time at 150° C. of 120 seconds or less) are obtainable with the use of the phenol compound in an amount of 2.5-5% by weight based on the mixture (A) and this range is preferred.

The epoxy resin composition of the present invention may further contain one or more additives such as a filler, e.g. silica, alumina or hydrated alumina, a flame retardant, a coloring agent, an antifoaming agent and a plasticizer, as desired.

During storage and transportation, the composition according to the present invention is preferably rendered in the form of a two-component pack type composition consisting of the mixture (A) as a first component pack and the curing agent (B) as a second component pack. The above-mentioned diluent and the above additives may be incorporated into the first component pack (A).

In use, the components (A) and (B) are mixed and the mixture is applied dropwise to a coil to be fixed such as a stator or rotor coil of a motor or a generator, while rotating the coil to prevent the applied composition from running down. It is desirable to previously heat the coil to a curing temperature before the application of the composition. The curing may be performed at a temperature of 100-180° C. for 5-60 minutes.

The following examples will further illustrate the present invention, in which "part" is by weight.

EXAMPLE 1

An epoxy resin mixture (A) and a curing agent (B) having the following formulations were prepared:

| Epoxy resin mixture (A): | |
|---|---|
| Bisphenol A epoxy resin*1 | 80 parts |
| 3,4-Epoxycyclohexylmethyl 3,4-epoxycyclohexanecarboxylate*2 | 15 parts |
| 1,6-Hexanediol diglycidyl ether*3 | 5 parts |
| Curing agent (B): | |
| Methylbutenyltetrahydrophthalic anhydride*4 | 60 parts |
| Methyltetrahydrophthalic anhydride | 43 parts |
| 2,4,6-Tri(N,N-dimethylaminomethyl)-phenol*5 | 3 parts |

*1: ADECA EP-4300, manufactured by Asahi Denka K. K., epoxy equivalent: 180-200
*2: SEROXIDE 2021, manufactured by Dicel Kagaku Kogyo K. K.
*3: ADECA ED-503, manufactured by Asahi Denka K. K.
*4: EPICURE YH-306, manufactured by Yuka Shell Epoxy Inc.
*5: compound of the following formula:

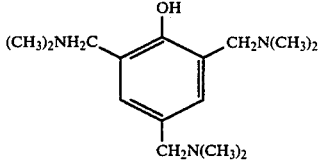

The thus obtained epoxy resin mixture (A) and the curing agent (B) were blended with a blending ratio (A)/(B) of 100/115 (wt/wt) to obtain an epoxy resin composition.

A copper wire (diameter: 2 mm) was wound around a core to obtain a rotor coil having five-layered windings. The coil was heated to 160° C., onto which was applied dropwise the above epoxy resin composition while slowing rotating the coil. The coil impregnated with the epoxy resin composition was maintained at 160° C. for 15 minutes to cure the composition. The windings were found to be tightly and integrally fixed with each other. No change in color or in bonding was observed even when the coil was allowed to stand at 180° C. for 24 hours. After cooling, the coil was cut along a plane crossing the winding direction. It was found that the resin had penetrated into entire interstices of the coil.

EXAMPLE 2

An epoxy resin mixture (A) and a curing agent (B) having the following formulations were prepared:

| Epoxy resin mixture (A): | |
|---|---|
| Bisphenol A epoxy resin*6 | 60 parts |
| 3,4-Epoxycyclohexylmethyl (3,4-epoxy)cyclohexane carboxylate*2 | 40 parts |
| Curing agent (B): | |
| Methyltetrahydrophtalic anhydride *7 | 97 parts |
| 2,4,6-Tri(N,N-dimethylaminomethyl)-phenol*5 | 4 parts |

*2: the same as used in Example 1
*5: the same as used in Example 1
*6: Epicote 828, Epoxy equivalent: 184-194, manufactured by Yuka Shell Epoxy Inc.
*7: Epicron B-570 manufactured by Dainihon Ink Kagaku Kogyo K. K.

The thus obtained epoxy resin mixture (A) and the curing agent (B) were blended with a blending ratio (A)/(B) of 1:1 (wt/wt) to obtain an epoxy resin composition having an initial viscosity at 25° C. of 600 cps. This composition was tested for gellation time, curability and coloring and was found to show a gellation time of 80 seconds, good curability and no coloring. The test methods are as follows:

Gellation time

The composition (0.4 cc) is dropped onto a plate heated previously heated to 150° C. and the period of time required for the composition to gel and to lose its fluicity is measured.

Curability

The composition is applied to a coil in the same manner as that in Example 1, heated at 160° C. for 15 minutes, immediately cooled. Then the glass transition point of the resin is measured. When the measured glass transition point has reached its maximum value, the curability is regarded as being good. If not yet reached, then the curability is regarded as being poor.

Coloring

The composition is processed to obtain a cured test piece having a size of 100×100×1 mm. The test piece is then aged at 180° C. for 24 hours. If the aged test piece shows a light transmittance of more than 10%, the test piece is regarded as being free of coloring. If exceeds 10%, the test piece is regarded to be colored.

EXAMPLE 3

Example 2 was repeated in the same manner as described except that the Bisphenol A and alicyclic epoxy resins were used in amounts of 80 parts and 20 parts, respectively. The resulting composition showed an initial viscosity at 25° C. of 800 cps, a gellation time of 80 seconds and good curability, and was free of coloring.

EXAMPLE 4

Example 2 was repeated in the same manner as described except that the phenol compound was used in an amount of 2.5 parts. The resulting composition showed an initial viscosity at 25° C. of 600 cps, a gellation time of 110 seconds and good curability, and was free of coloring.

EXAMPLE 5

Example 2 was repeated in the same manner as described except that the phenol compound was used in an amount of 5 parts. The resulting composition showed an initial viscosity at 25° C. of 600 cps, a gellation time of 70 seconds and good curability, and was free of coloring.

COMPARATIVE EXAMPLE 1

Example 2 was repeated in the same manner as described except that 3 parts of 2-ethyl-4-methylimidazole were used in lieu of 4 parts of the phenol compound. The resulting composition showed an initial viscosity at 25° C. of 600 cps, a gellation time of 100 seconds and good curability, but was colored.

COMPARATIVE EXAMPLE 2

Example 2 was repeated in the same manner as described except that the phenol compound was used in an amount of 1 part. The resulting composition showed an initial viscosity at 25° C. of 600 cps and a gellation time of 180 seconds and, and was free of coloring. However, the curability was poor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A liquid, epoxy resin composition comprising:
   (A) a mixture containing
      ($a_1$) a Bisphenol A epoxy resin, and
      ($a_2$) an alicyclic epoxy resin; and
   (B) a curing agent including
      ($b_1$) an acid anhydride, and
      ($b_2$) a phenol compound of the general formula:

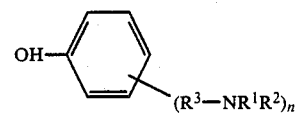

wherein $R^1$ and $R^2$ represent independently from each other a lower alkyl, $R^3$ represents a lower alkylene and n is an integer of 1–5, the amount of said phenol compound being 2–8% based on the weight of the mixture (A).

2. A composition as claimed in claim 1, wherein the Bisphenol A epoxy resin has an epoxy equivalent of 170–270.

3. A composition as claimed in claim 1, wherein the alicyclc epoxy resin is a compound selected from the group consisting of 3,4-epoxycyclohexylmethyl 3,4-epoxycyclohexane-carboxylate, vinylcyclohexylene dioxide, bis(3,4-epoxycyclohexylmethyl) adipate or 6-(3,4-epoxycyclohexyl)-1,5-meta-dioxane-3-spiro-3',4'-epoxycylohexane.

4. A composition as claimed in claim 1, wherein the weight ratio of the Bisphenol A epoxy resin to the alicyclic epoxy resin is 3:7 to 9:1.

5. A composition as claimed in claim 1, wherein the acid anhydride is a compound selected from the group consisting of methyltetrahydrophthalic anhydride, methylhexahydrophthalic anhydride, methylnadic anhydride and methylbutenyltetrahydrophthalic anhydride.

6. A composition as claimed in claim 1, wherein $R^1$ and $R^2$ stand independently from each other methyl, ethyl or propyl, $R^3$ stands for methylene or ethylene and n is an integer of 2–4.

7. A composition as claimed in claim 1, wherein the phenol compound is 2,4,6-tri(N,N-dimethyl)aminomethylphenol or 2-(N,N-dimethyl)aminomethylphenol.

8. A composition as claimed in claim 1, wherein the acid anhydride is used in an amount of 0.5–1.5 mole per one equivalent of the epoxy group of the mixture (A).

9. A composition as claimed in claim 1, wherein the phenol compound is used in an amount of 2.5–5% based on the weight of the mixture (A).

10. A composition as claimed in claim 1, further comprising a diluent selected from the group consisting of 1,6-hexanediol diglycidyl ether, polyalkylenglycol diglycidyl ether, trimethylolpropane triglycidyl ether, butyl glycidyl ether and phenyl glycidyl ether.

11. A composition as claimed in claim 10, wherein the diluent is used in an amount not more than 20% based on the weight of the mixture (A).

12. A composition as claimed in claim 1 and exhibiting a gellation time at 150° C. of not longer than 120 seconds.

13. A composition as claimed in claim 1, and being a two-component type composition consisting of said mixture (A) as a first component and said curing agent (B) as a second component.

14. A method of fixing windings of a coil with a composition according to claim 1, comprising the steps of:
heating the windings to a temperature of 100°–180° C., dropping the composition onto the heated windings to impregnate the windings with the composition; and
heating the impregnated windings at 100°–180° C. to permit the composition to cure.

* * * * *

UNITED STATES PATENT AND TRADEMARK OFFICE
CERTIFICATE OF CORRECTION

PATENT NO. : 4,954,602
DATED     : September 4, 1990
INVENTOR(S) : AKUTAGAWA et al It is certified that error appears in the above-identified patent and that said Letters Patent is hereby corrected as shown below:

Col. 2, lines 35-42, the following formula:

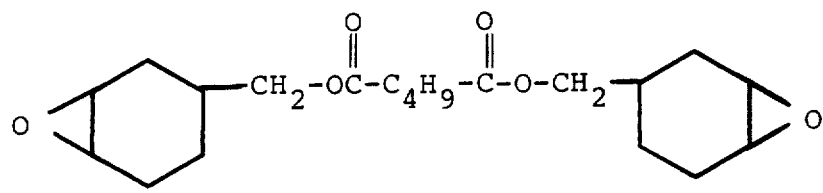

should read:

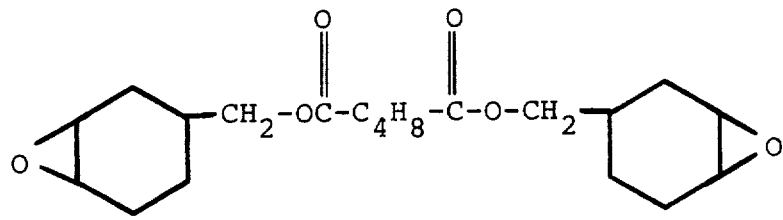

UNITED STATES PATENT AND TRADEMARK OFFICE
CERTIFICATE OF CORRECTION

PATENT NO. : 4,954,602

DATED : September 4, 1990

INVENTOR(S) : AKUTAGAWA et al

It is certified that error appears in the above-identified patent and that said Letters Patent is hereby corrected as shown below:

Col. 5, line 9, "fluicity" should read --fluidity--.

Col. 6, line 63, "polyalkylenglycol" should read --polyalkyleneglycol--.

Signed and Sealed this

Seventeenth Day of March, 1992

Attest:

HARRY F. MANBECK, JR.

*Attesting Officer*　　　　*Commissioner of Patents and Trademarks*